Figure 1:
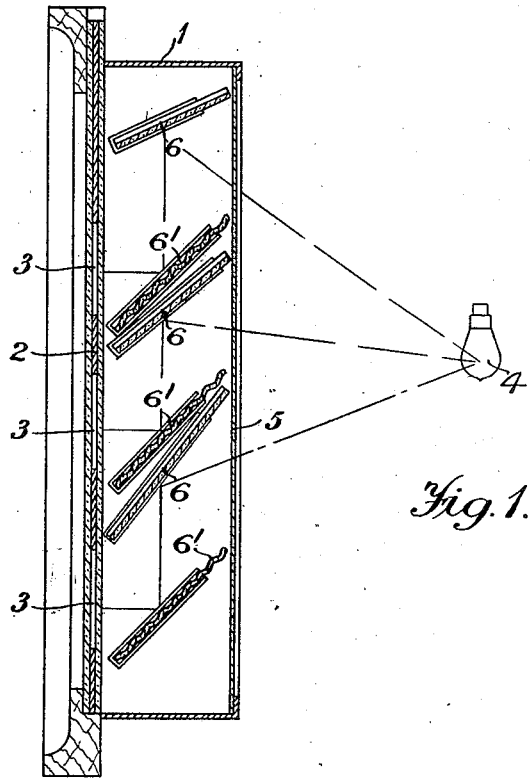

W. J. BEVILLE.
ILLUMINATED SIGN OR ADVERTISEMENT.
APPLICATION FILED MAY 17, 1921.

1,430,147.

Patented Sept. 26, 1922.
2 SHEETS—SHEET 1.

INVENTOR:
Webster John Beville
By Wm Wallace White ATT'Y.

W. J. BEVILLE.
ILLUMINATED SIGN OR ADVERTISEMENT.
APPLICATION FILED MAY 17, 1921.

1,430,147.

Patented Sept. 26, 1922.
2 SHEETS—SHEET 2.

INVENTOR.
Webster John Beville
By Wm Wallace White
ATT'Y.

Patented Sept. 26, 1922.

1,430,147

UNITED STATES PATENT OFFICE.

WEBSTER JOHN BEVILLE, OF LONDON, ENGLAND.

ILLUMINATED SIGN OR ADVERTISEMENT.

Application filed May 17, 1921. Serial No. 470,284.

(GRANTED UNDER THE PROVISIONS OF THE ACT OF MARCH 3, 1921, 41 STAT. L., 1313.)

*To all whom it may concern:*

Be it known that I, WEBSTER JOHN BEVILLE, a subject of the King of Great Britain and Ireland, residing at 5 Cardwell Terrace, Tufnell Park, London, N., 7, England, have invented new and useful Improvements in Illuminated Signs or Advertisements (for which I have filed an application in England, #13,175, dated May 12, 1920), of which the following is a specification.

The invention relates to illuminated signs or advertisements which comprise a casing that is fitted with an illuminable sign-bearing face or faces and is illuminated by a lamp or lamps located either in rear of or above or within the casing of the sign, or, if desirable, below said casing.

The object of the invention is to obtain an increased and more uniform illumination of the sign-bearing face or faces of said signs or advertisements.

These results are obtained by providing the interior of the casing of a sign of the above described type with a plurality of reflectors disposed at suitable angles to the sign-bearing face or faces of the sign and to one another and the source of light and consisting of one or more sets of reflectors, which set of reflectors or each of which sets of reflectors consists of a reflecting member on to which the rays of light from the lamp or lamps first fall, and of a second reflecting member adapted to receive the rays of light from said first reflecting member and to reflect them on to the sign-bearing face or faces of the sign. Said first reflecting member preferably consists of a piece of silvered fluted glass, that is to say a piece of fluted glass silvered on its rear face, having its flutings arranged transversely to the direction of the length of the member, whilst said second reflecting member consists of a piece of silvered fluted glass having its flutings running lengthwise of the member. Alternatively one of said reflecting members may consist of a piece of silvered plain glass, that is to say a flat piece of glass silvered on its rear face, and the other reflecting member of each set of reflectors consist of a piece of silvered fluted glass. When said alternative reflecting members are used the sign is, for the purposes of obtaining even diffusion of the rays of light and a uniform illumination of the sign-bearing face, provided with a sheet of fluted clear glass having its flutings disposed at a suitable angle to the flutings of the silvered fluted glass.

The invention is illustrated by the accompanying drawings.

Figure 2:
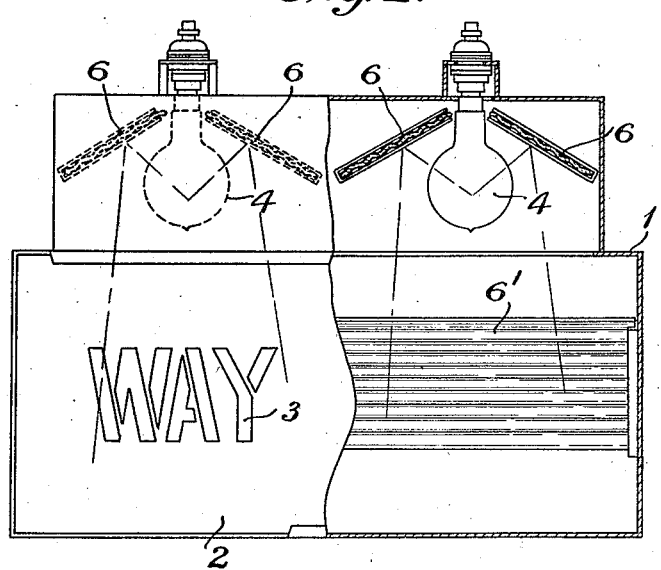
Figure 3:
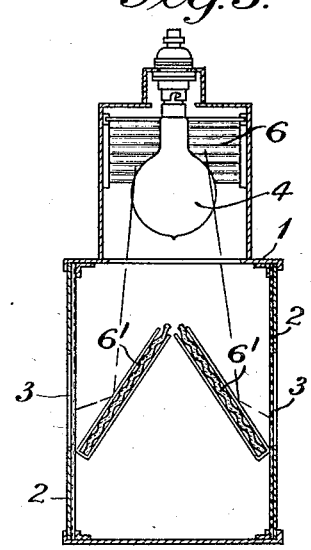
Figure 4:
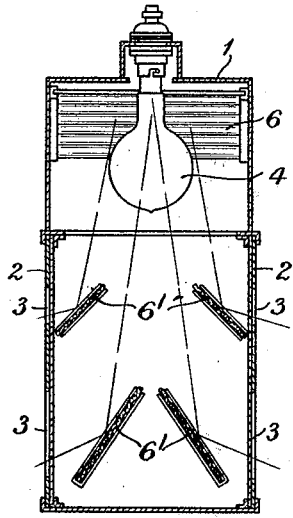
Figure 5:
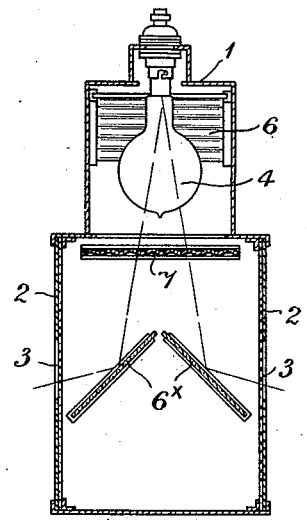
Figure 6:
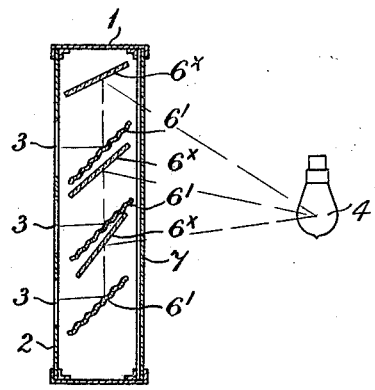

Fig. 1 is a transverse section of one construction of sign, intended to be illuminated from its rear, in which the reflecting members of the sets of members consist of silvered fluted glass. Fig. 2 is a part front view and part section and Fig. 3 is a transverse section of a sign which is illuminated by lamps in the upper part of the sign. Figs. 4 and 5 are transverse sections of signs of similar construction to the sign illustrated by Figs. 2 and 3. Fig. 6 is a transverse section of a further construction of sign.

In all of the figures 1 are the casings of the signs, 2 are the sign-bearing faces of the signs, 3 are the parts of said faces bearing the matter to be displayed, and 4 are incandescent electric lamps for illuminating the signs. The paths of the rays of light from the lamp or lamps on to the first members of the sets of reflectors, and from these members on to the second members of said set of reflectors, and from the second members on to the sign-bearing faces are indicated in the drawing by lines.

Referring first to the construction of sign illustrated by Fig. 1, 5 is the rear wall of the sign, made of clear glass to allow of the free passage of rays of light from the lamp or lamps 4. 6 and $6^1$ are the reflecting members of the sets of reflectors, contained within the casing 1 and disposed at a suitable angle to the sign-bearing face 2. The reflecting members 6 consist of strips of silvered fluted glass having their flutings arranged transversely to the lengths of the strips, while the reflecting members $6^1$ consist of strips of silvered fluted glass of which the flutings run lengthwise of the strips. In this construction of sign the rays of light emitted from the lamp or lamps 4 first fall on to the reflecting member 6, are reflected thence on to the members $6^1$, and are finally reflected on to the parts 3 of the sign-bearing face 2, the result of the relative dispositions of the flutings of the reflecting members 6 being an even diffusion of the rays of light emitted from the lamp or lamps and a uniform illumination of the sign. When the letters or other matter to be displayed are to be coloured. coloured varnish may be applied to the sheet of glass forming the rear wall of the sign, or coloured varnish may be applied to the sign-bearing face 2 or the latter be backed by a suitably coloured sheet of glass.

In the sign illustrated by Figs. 2 and 3 the reflecting members 6 and $6^1$ are similar to the reflecting members used in the case of the sign illustrated by Fig. 1. In the present case however the lamps 4 are disposed within the upper part of the casing 1 of the sign, and the reflecting members 6 are disposed above the lamps. As in the case of the sign illustrated by Fig. 1, the rays of light emitted from the lamps 4 falling on to the reflecting members 6 are reflected thence on to the reflecting members $6^1$ and from the latter on to the display parts 3 of the sign-bearing face 2 of the sign.

In the modified construction of sign illustrated by Fig. 4 the second reflecting members $6^1$ are employed in duplicate and are disposed in echelon, that is to say sufficient space is left between the upper edges of the first of said members $6^1$ to allow part of the rays of light reflected from the first reflecting members 6 to fall on to the lowermost of the reflecting members $6^1$. Otherwise the construction of the sign is not different from the sign illustrated by Figs. 2 and 3. As will be obvious more than two tiers of the reflecting members $6^1$ may be used.

In the modified construction of sign illustrated by Fig. 5 the lamps 4 are placed in the upper part of the casing 1 of the sign, and the first reflecting member 6, consisting of strips of silvered fluted glass having their flutings disposed transversely to the lengths of the strips, are located above the lamps 4. The second reflecting members $6^x$ consist of strips of silvered plain glass. With a view to obtaining the even diffusion of light and uniform illumination arising from the relative disposition of the flutings of the strips 6 and $6^1$ of silvered fluted glass of the previously described constructions of signs, the sign is provided with a sheet of fluted clear glass 7. This sheet of fluted clear glass, which has its flutings running lengthwise of the sheet, may either be placed above the reflecting members $6^x$, as shown, or at the back of the sign-bearing face 2, or may, in certain cases, form the material of the sign-bearing face. In this construction of sign the rays of light emitted from the lamps 4 falling on to the reflecting members 6 are reflected, through the sheet 7 of fluted clear glass, on to the reflecting members $6^x$, whence they are reflected on to the display parts 3 of the sign-bearing face 2.

In the case of the sign illustrated by Fig. 6 the lamps 4 are placed at a suitable distance from the rear wall of the casing 1 of the sign, and said casing is fitted with sets of reflectors each of which consists of a strip $6^x$ of plain silvered glass and a strip $6^1$ of silvered fluted glass having its flutings running lengthwise of the strip. As in the case of the sign illustrated by Fig. 5, and for the same purpose, the sign is also provided with a sheet of fluted clear glass. This sheet of fluted clear glass 7 may form the rear wall of the casing of the sign, as shown, or may be placed immediately in rear of the sign-bearing face, or, in certain cases, form the material of said sign-bearing face.

In all cases the flutings of the first of the fluted members, whether said first member is a reflector or a sheet of fluted clear glass, are disposed transversely to the member, as with this disposition of the flutings the light falling on the member is caused to run lengthwise of the member and a better diffusion of light is obtained than if the flutings ran lengthwise of the member. Further the flutings on the co-operating members are preferably disposed at right angles to one another, though the relative disposition of the flutings may be at other angles, so long as in the one member the flutings run transversely to the member and in the second member in the direction of its length.

In the case of signs, such for instance as those illustrated by Figs. 5 and 6, in which each of the sets of reflectors comprises a strip of silvered fluted glass and a strip of silvered plain glass, a second sheet of fluted clear glass may be used.

In all cases the silvered fluted glass and the silvered plain glass may be replaced by metal provided with a bright reflecting surface. The silvered glass is however preferable to metal because the latter tarnishes and deteriorates with use, whereas silvered glass is durable and can be easily cleaned.

In the majority of cases more than one set of reflectors are used, and in the following claims the expression set of reflectors is intended to cover signs in which a plurality of sets of reflectors is used.

Having now described my invention, what I have invented and desire to secure by Letters Patent of the United States is as follows:—

1. An illuminated sign, comprising a source of light, a casing having an illuminable sign-bearing face, a fluted reflecting member adapted to receive the light from said source, and a second fluted reflecting member adapted to receive said light from said first reflecting member and reflect it on to said sign-bearing face, the flutings of said first reflecting member extending transversely of the member and the flutings of said second reflecting member extending at right-angles thereto.

2. An illuminated sign comprising a casing fitted with an illuminable sign-bearing face and with a set of reflectors in said casing consisting of a fluted reflecting member adapted to receive rays of light from a lamp and a second fluted reflecting member adapted to receive the rays of light reflected from said first reflecting member and to reflect them on to the sign-bearing face, the flutings of said reflecting members running at suitable angles to one another, and said members being so disposed with respect to one another and the sign-bearing face that the latter is solely illuminated by rays of light reflected from the second reflecting member, substantially as described.

3. An illuminated sign comprising a casing fitted with illuminable sign-bearing faces and with a set of reflectors in said casing consisting of a fluted reflecting member adapted to receive the rays of light from a lamp and of a plurality of fluted reflecting members arranged below said fluted reflecting member and disposed in echelon, and adapted to receive the rays of light reflected from said fluted member and to reflect them on to the sign-bearing face, said reflecting members being so disposed relatively to said lamp that a portion of the rays of light reflected from the first reflecting member fall directly on the reflecting member farthest from said light, the flutings of the two sets of fluted reflectors being disposed at suitable angles to one another, and said plurality of fluted members being so disposed with respect to one another and the sign-bearing faces that the latter are solely illuminated by rays of light reflected from the plurality of reflecting members, substantially as described.

In testimony whereof I have signed my name to this specification.

WEBSTER JOHN BEVILLE.